United States Patent

[11] 3,596,354

| [72] | Inventor | Ralph W. Emerson<br>116 N. Lee, Cordell, Okla. 73632 |
|---|---|---|
| [21] | Appl. No. | 868,373 |
| [22] | Filed | Oct. 22, 1969 |
| [45] | Patented | Aug. 3, 1971 |

[54] WATERMELON-HANDLING UTENSIL
11 Claims, 6 Drawing Figs.
[52] U.S. Cl. .................................................. 30/124, 146/146
[51] Int. Cl. ........................................................ B26b 11/00
[50] Field of Search ............................................ 30/114, 124, 289, 290; 146/140, 141, 146, 146.1, 215

[56] References Cited
UNITED STATES PATENTS

| 1,013,361 | 1/1912 | Barry | 146/146 |
| 1,830,284 | 11/1931 | Massa | 146/146 |
| 3,009,599 | 11/1961 | Schier | 220/1 |

FOREIGN PATENTS

| 15,140 | 9/1891 | Great Britain | 146/215 |

*Primary Examiner*—Robert C. Riordon
*Assistant Examiner*—J. C. Peters
*Attorney*—Dunlap, Laney, Hessin & Dougherty ABSTRACT: A watermelon-cutting and -serving utensil which includes a watermelon-containing housing having sidewalls and a bottom. Upwardly projecting tines are secured to the bottom for retaining a whole, uncut watermelon in the housing. An elongated cutting device has one of its ends pivotally secured in a track extending across the central portion of the bottom of the housing between the tines. Retaining clips are provided on the bottom of the housing to one side of the tines for cooperation with a spring-biased restraining clip secured to the upper edge of one of the sidewalls of the housing in holding in place a plurality of nested serving trays which are utilized in serving slices of the melon. Each serving tray is provided with a plurality of small tines in the bottom thereof, and with an opening for permitting the juice of the melon to drain from the tray without simultaneously discharging seeds from the tray.

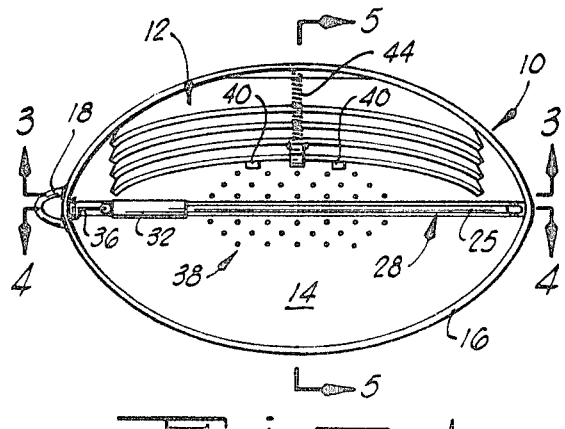
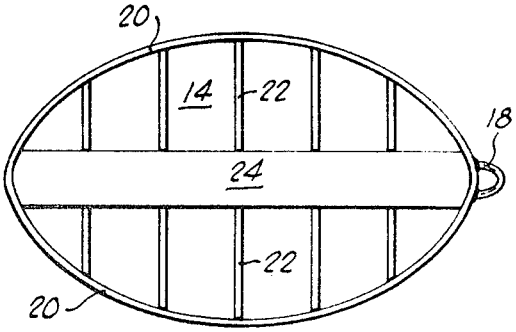
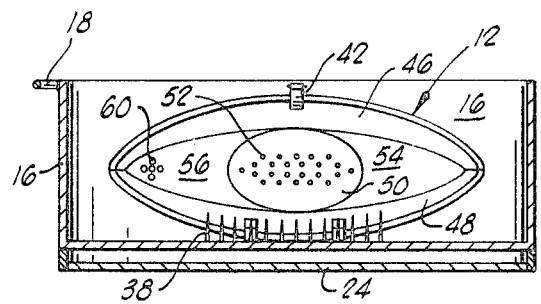
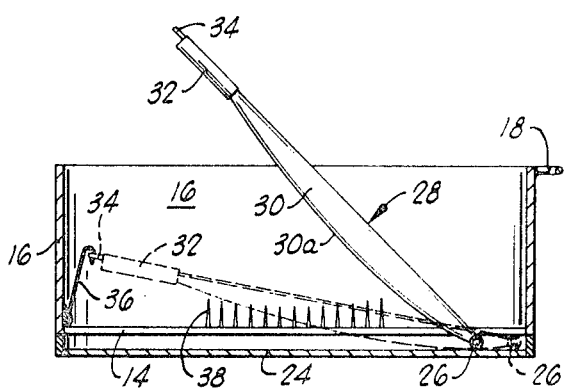
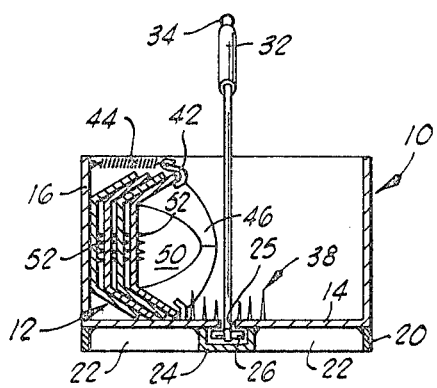
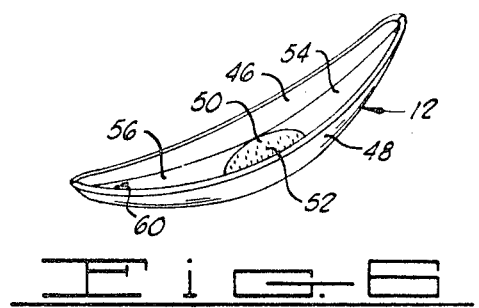
INVENTOR
RALPH W. EMERSON

WATERMELON-HANDLING UTENSIL

BACKGROUND OF THE INVENTION

1. Field of the Invention

This invention relates to devices for holding food stuffs during the preparation thereof, and during the consumption thereof. More particularly, the present invention relates to a utensil for holding a whole watermelon so that the watermelon can be more easily cut into slices, and for then providing serving trays upon which such slices of watermelon can be conveniently retained while the watermelon is eaten.

2. Brief Description of the Prior Art

Various devices and utensils have heretofore been provided for serving various types of food. In some instances, the character of the food renders it difficult to eat without soiling of clothing, or dripping juices from the food on the clothing or in an undesirable location. To my knowledge, however, no utensil or device has heretofore been provided for holding a watermelon so that it can be more easily cut into easily handled slices, and for then retaining the slices in a convenient position to permit the watermelon to be eaten without concurrent drippage of the liquid from the melon in a most inconvenient manner.

BRIEF DESCRIPTION OF THE PRESENT INVENTION

The present invention provides a compact, portable utensil for permitting a whole watermelon to be firmly retained in a desired position while the watermelon is cut through to form symmetrical slices which can then be placed upon trays forming a part of the utensil to facilitate the eating of the slices. The trays are formed to hold the slices firmly while pieces of the melon are cut from the portion being eaten, and the serving trays are further constructed to permit easy and convenient discharge of the melon's liquid without concurrently discharging the seeds.

Broadly described, the utensil of the invention comprises a slicing container which includes a sidewall and a bottom, and which preferably has a hanging eye or handle secured to one end thereof to permit the slicing container to be hung on a wall when not in use. A track is formed in the bottom of the slicing container to slidably accommodate a retaining pin secured to one end of an elongated blade or other cutting member used to slice through the melon. The blade may be pivoted upon the pin carried in the track, so that it may be pressed through the melon to slice it into sectors suitable for consumption. A pair of brackets and a spring-biased retaining clip are located adjacent one sidewall of the container to retain in this location, a plurality of nested serving trays which can be detached and utilized for serving slices of the melon after it has been cut.

Secured to the bottom wall of the slicing container are a plurality of upwardly projecting tines which are of varying length, and are arrayed so as to securely retain the watermelon against rolling or shifting in the container while the melon is being sliced.

From the foregoing broad description of the invention, it will be perceived that the present invention provides a watermelon-slicing-and-serving utensil which is of relatively compact construction, is portable and can be easily stored when not in use by hanging on a nail, or other retaining member, against the wall in an out-of-the-way location.

Another object of the invention is to provide a relatively economically constructed utensil which can be used for quickly and symmetrically slicing a whole watermelon into a plurality of sections.

A further object of the invention is to provide a utensil which can be dually utilized for slicing watermelon into sections, and for serving these sections in neat attractive serving trays which function to permit the juice or water to be drained from the melon slices during eating thereof, but which prevent seeds from being drained from the serving trays with the juices.

A further object of the invention is to provide a utensil for slicing and serving watermelon, which utensil includes a plurality of nested serving trays which are detachably retained in a housing or container used for slicing the melon.

Another object of the invention is to provide a utensil for slicing and serving watermelon, which utensil is characterized in having a long service life due to its mechanically strong construction.

Other objects and advantages of the invention will become apparent as the following detailed description of the invention is read in conjunction with the accompanying drawing which illustrates the invention.

BRIEF DESCRIPTION OF THE DRAWINGS

FIG. 1 is a plan view of the watermelon-slicing-and-serving utensil of the invention.

FIG. 2 is a bottom view of the watermelon-slicing-and-serving utensil of the invention.

FIG. 3 is a sectional view taken along line 3–3 of FIG. 1.

FIG. 4 is a sectional view taken along line 4–4 of FIG. 1.

FIG. 5 is a sectional view taken along line 5–5 of FIG. 1.

FIG. 6 is a perspective view of one of the serving trays of the watermelon-slicing-and-serving utensil of the invention.

Referring now to the drawings, and particularly to FIG. 1, a watermelon-slicing container or housing is designated generally by reference numeral 10 and is shown as it appears when it contains a plurality of nested, detachable serving trays designated generally by reference numeral 12. The slicing container 10 includes a relatively flat or monoplanar bottom wall 14 which is secured to the lower edge of an oval sidewall 16. Actually, the sidewall 16 will often, particularly in the case of metallic construction, be made of a pair of symmetrical and identical arcuate halves, though in the case of a molded plastic construction, will sometimes be made of a single structural member which is oval in configuration. Secured to the sidewall 16 adjacent the top edge thereof, and at one end of the slicing container 10 is an eye or handle 18 by which the slicing container 10 may be carried, and by which the entire utensil may be hung upon a wall when not in use. It will be noted that when the utensil is hung upon a vertically extending wall, the upper edge of the sidewall 16 occupies a single plane and abuts flatly against such vertical wall.

In the illustrated embodiment of the invention, there is secured around the outer edge of the bottom wall 14, a downwardly extending supporting flange 20. A plurality of transverse ribs 22 extend across the bottom of the container 10 for the reinforcement of the bottom wall (see FIG. 2). A channel member 24 is secured longitudinally of the container 10 from one end thereof to the other between the aligned transverse ribs 22. The channel member 24 registers with a slot 25 formed in the bottom wall 14 and with this slot forms a track which receives a pin 26. The pin 26 is extended through one end of an elongated cutting member or blade designated generally by reference numeral 28. The pin 26 is preferably made of a relative low friction material, such as nylon or Teflon and is free to slide along the track which is formed by the channel member 24 and the slotted bottom wall 14. It will thus be seen that the blade 28 is free to pivot about a horizontal axis extending through the center of the pin 26, and can also be reciprocated in the track formed by the channel member 24 and the bottom wall 14.

The cutting member or blade 28 includes a blade element 30 which is sharpened to a cutting edge 30a at the lower side thereof, and which extends into a handle 32 at the end of the blade 28 opposite that end which is connected to the pin 26. An eye 34 is secured to the handle 32 and permits the blade 28 to be latched down in the dashed-line position illustrated in FIG. 4 by means of a latch member 36. Latch member 36 is pivotally secured to the sidewall 16 so that it lies flat on the bottom wall 14 of the container 10 when not in use for latching the blade 28 in its inoperative position. It will be observed in referring to FIG. 4 that when the blade 28 is latched in the manner illustrated, it is completely within the container 10 and cannot pivot outwardly from this position. Thus, the blade 28 can be retained stored within the container 10, and cannot swing outwardly to present a safety hazard, or to increase the overall bulk of the utensil.

On opposite sides of the slot 25 formed in the bottom wall 14 of the container 10 are a plurality of upwardly projecting spikes or tines 38. It will be noted that these spikes or tines 38 are sharpened at their upper ends, and are of differing lengths so that those which are most distally located with respect to the slot 25 in the bottom wall 14 (or stated differently, are most nearly located with respect to the sidewall 16) are of greater length than those which are relatively near to the slot. Also, in referring to FIG. 4, it will be noted that those tines 38 which are nearest the opposite ends of the container 10 are of greater length than those which are more centrally located in the container 10. The sharpened upper ends of the tines 38, when considered as a collective array, are thus of substantially complementary configuration to the outer periphery of the watermelon, and serve to impale the watermelon during the slicing thereof in a manner hereinafter explained in greater detail.

Extending upwardly from the bottom wall 14 to one side of the tines 38 are a pair of horizontally spaced retainer clips 40. The retainer clips 40 are preferably made of spring metal and are bent at their upper ends toward the sidewall 16. The retainer clips 40 function to engage the upper edge of one of the sidewalls of one of the serving trays 12 when a plurality of such serving trays are nested within each other and stored within the slicing container 10 in the manner best depicted in FIGS. 1, 3 and 5. The nested serving trays 12 are further retained in the illustrated position within the slicing container 10 by an upper clip or bracket 42 which is secured to one end of a helical spring 44 having its other end secured in any suitable way adjacent the upper edge of the sidewalls 16 of the slicing container 10.

The details of construction of one of the serving trays 12 is best illustrated in FIG. 6 of the drawings. It will be noted in referring to this figure that each serving tray 12 includes a pair of arcuately shaped sidewalls 46 and 48 which are joined at their opposite ends to form the ovally configured serving tray. Each serving tray 12 further includes a flat or monoplanar bottom wall 50 which has a plurality of small, upwardly projecting tines 52 secured thereto, and which is joined to a pair of upwardly inclined bottom walls 54 and 56. The ends of the bottom walls 54 and 56 are thus at a considerably higher elevation than the bottom wall 52 when each serving tray is rested flatly upon a table or other supporting structure. Adjacent the outer end of the bottom wall 56 (at a location adjacent the point of intersection and securement of the sidewalls 46 and 48), this bottom wall is provided with a plurality of relatively small apertures or perforations 60 which function to permit the water or juice to be drained from the serving trays 12, but which are sufficiently small to prevent seeds from the watermelon from passing therethrough.

USE AND OPERATION OF INVENTION

In utilizing the invention, the utensil may be assumed to be stored in a status which is illustrated in FIG. 1. As has been explained, when the serving trays 12 are nested and retained within the slicing container 10 in the position illustrated, the entire utensil may then be stored by hanging it on a suitable retaining element against a flat vertical wall.

At such time as it is desired to utilize the utensil, it is removed from the wall and the serving trays 12 are disengaged from the brackets 40 and 42. When the serving trays have been removed from the interior of the slicing container 10, the spring 44 and the bracket 42 will hang down along the sidewall 16. It will be noticed that the upper edges of the brackets 40 are at a lower level than the pointed upper ends of the tines 38 secured to, and projecting upwardly from, the bottom wall 14. The blade 28 is then released from the latch member 36 and is pivoted upwardly so that the top side of the blade bears against the end portion of the slicing container 10. The watermelon is then placed in the slicing container so that its outer periphery bears against the tines 38. These tines impale the watermelon, and often the watermelon will also be confined and prevented from rolling or turning by contact of its outer periphery with the sidewalls 16 of the container 10.

With the watermelon in position, the blade 28 is pivoted downwardly to slice cleanly through the watermelon from one end thereof to the other. It will be noted that the blade 28 can be reciprocated by moving the pin 26 in the track formed in the bottom wall 14 as may be required in order to obtain the leverage which may be desired or necessary, depending on the size of watermelon which is to be cut. When the watermelon has been halved by the use of the blade 28, each half of the watermelon may then be rotated through 90° with the cut surface thereof facing upwardly so that the watermelon half can be cut through to make a section equivalent to a quarter of the melon. Then, if desired, each quarter of the melon can again be cut by impaling the quarter of the melon on the tines 38 in proper alignment with the blade 28.

After the melon has been sectioned in the manner described, each section of the melon is placed upon one of the serving trays 12 and is ready to be eaten. It will be noted that each serving tray 12 is of substantially complementary configuration with respect to the section of the melon which it receives, and the melon slice is supported upon the bottom walls 50, 54 and 56, and is held in place by the tines 52 projecting upwardly from the bottom wall 50. Usually, the sidewalls 46 and 48 of each serving tray 12 will also aid in maintaining the slice of melon in the proper position. The melon may then be eaten in any of the ways which is customary i.e. with a fork, knife, or spoon. The seeds may be raked off the side of melon slice into the bottom of each serving tray 12, and will be retained in this location until the slice of melon is completely consumed.

During the eating of the melon, the serving tray 12 which contains a slice may be kept relatively dry by periodically draining the juices or water of the melon out of the tray through the apertures or perforations 60. These perforations or apertures, in being located at the depicted location within the serving tray, provide an option to the user of whether the juice shall be drained or not. Thus, when melon is eaten outside of the household, it may be desirable to frequently drain the water from the serving tray onto the lawn or other location, and this may be easily done by simply slightly tilting the serving tray 12 so that the water will pass through the apertures 60. When the melon is served within the home, however, by permitting the tray 12 to rest flatly on a table or other serving location, there will normally not be a sufficient amount of juice or water which drains from the melon slice to permit the accumulation of juice in the bottom of the serving tray to reach the level of the apertures or perforations 60. Thus, no spillage will occur. It should be pointed out, that where it is desired to drain the juices from the serving tray, the perforations or apertures 60 do not permit the seeds to concurrently pass from the tray with the juices. Thus, there is no problem of seeds being dropped on the lawn or other locations where they would be undesirable.

Although a preferred embodiment of the invention has been herein described, it is to be understood that various changes and innovations can be made in the described structure without departure from the basic principles which underlie the invention. All changes and innovations of this type are therefore deemed to be circumscribed by the spirit and scope of the invention.

What I claim is:
1. A utensil for handling watermelon comprising:
an oval slicing container including:
    a sidewall;
    a bottom wall secured to the lower edge of the sidewall;
    track means in said bottom wall extending the length thereof; and tines projecting upwardly from the bottom wall on opposite sides of the track means for impaling a watermelon; and elongated blade means having one end pivotally secured in said track means for pivotation about a horizontal axis and reciprocably mounted in said track means.

2. A utensil as defined in claim 1 and further characterized as including means secured to the outside of said sidewall for hanging said container on a wall.

3. A utensil as defined in claim 1 wherein said tines are of varying length and terminate in sharpened upper ends arrayed in a configuration adapted to mate with the outer periphery of a watermelon.

4. A utensil as defined in claim 1 and further characterized as including clip means secured to the inside of said slicing container and adapted to retain a plurality of serving trays in nested relationship inside said slicing container.

5. A utensil as defined in claim 1 and further characterized to include:
a plurality of serving trays nested within each other; and
means detachably retaining said serving trays within said slicing container.

6. A utensil as defined in claim 1 and further characterized as including means secured to the inside of said slicing container and detachably engageable with said blade means for retaining said blade means in a downwardly pivoted position in juxtaposition to the bottom wall of said slicing container.

7. A utensil as defined in claim 5 wherein each of said slicing trays comprises:
a pair of arcuate sidewalls joined at opposite ends and having a substantially greater height at a central portion of each than at the end portion thereof; and
bottom wall means secured to the lower edges of the sidewalls to form therewith an enclosure similar in configuration to a section cut from a figure of revolution of an ellipse.

8. A utensil as defined in claim 5 wherein said means for detachably retaining said serving trays within said slicing containers comprises:
a pair of horizontally spaced spring metal clips projecting upwardly from said bottom wall between said tines and said sidewall;
a helical spring having one end secured to said sidewall of the slicing container; and
a clip secured to the end of said helical spring opposite its end secured to said sidewall.

9. A utensil as defined in claim 1 wherein said track means comprises:
a channel member secured to the bottom side of said bottom wall; and
a slot in said bottom wall placing the interior of the slicing container in communication with the interior of the channel member.

10. A utensil for slicing and serving watermelon comprising:
a slicing container having at least one sidewall and a bottom wall;
tines projecting upwardly from the bottom wall for impaling a watermelon placed in the slicing container;
blade means pivotally secured to the inside of the slicing container for slicing through a watermelon placed in the slicing container; and
a plurality of serving trays nested in each other and detachably retained in said slicing container.

11. A utensil for slicing watermelon comprising:
an oval sidewall;
a bottom wall connected to the lower edge portion of the sidewall;
means within the oval sidewall for preventing rolling and rocking of a watermelon rested on the bottom wall; and
blade means pivotally connected to one of said walls for pivotation about a horizontal axis and extending from said axis across and above the center of said bottom wall when said blade means is pivoted to a horizontal position.